United States Patent
Mackenzie et al.

(10) Patent No.: US 11,951,799 B2
(45) Date of Patent: Apr. 9, 2024

(54) THERMAL MANAGEMENT FOR ELECTRIFIED VEHICLE

(71) Applicant: Ford Global Technologies, LLC, Dearborn, MI (US)

(72) Inventors: Kevin Mackenzie, Canton, MI (US);
Sunil Katragadda, Canton, MI (US);
Ronald Richard Semel, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/840,742

(22) Filed: Jun. 15, 2022

(65) Prior Publication Data

US 2022/0305877 A1    Sep. 29, 2022

Related U.S. Application Data

(63) Continuation of application No. 16/743,202, filed on Jan. 15, 2020, now Pat. No. 11,390,137.

(51) Int. Cl.
*B60H 1/00* (2006.01)
*B60H 1/32* (2006.01)
(Continued)

(52) U.S. Cl.
CPC ..... *B60H 1/00392* (2013.01); *B60H 1/00007* (2013.01); *B60H 1/00278* (2013.01); *B60H 1/00428* (2013.01); *B60H 1/32281* (2019.05); *B60H 1/32284* (2019.05); *B60H 1/323* (2013.01); *B60K 11/02* (2013.01);
(Continued)

(58) Field of Classification Search
CPC ........... B60H 1/00392; B60H 1/00007; B60H 1/00278; B60H 1/00428; B60H 1/32284; B60H 1/323; B60H 2001/3267; B60L 58/26; H01M 10/613; H01M 10/625; H01M 10/6556; H01M 10/6568; H01M 10/66
See application file for complete search history.

(56) References Cited

U.S. PATENT DOCUMENTS 6,124,644 A *  9/2000  Olson ..................... B60L 3/003
                                                180/65.245
6,360,835 B1 *  3/2002  Skala ................. H01M 8/04029
                                                180/65.22
(Continued)

FOREIGN PATENT DOCUMENTS

CN    109494428 A1    3/2019
DE    102019100096 A1 *  7/2020  ......... B60H 1/00278
(Continued)

*Primary Examiner* — Ljiljana V. Ciric
(74) *Attorney, Agent, or Firm* — David B. Kelley; Carlson, Gaskey & Olds, P.C.

(57) ABSTRACT

A thermal management system for an electrified vehicle and a method for managing such a system, includes a coolant subsystem to cool a battery pack and a refrigerant subsystem. The coolant subsystem includes a battery chiller in fluid communication with a cooling system inlet to the battery pack. The refrigerant subsystem includes a chiller cooling subsystem to cool the battery chiller and a cabin cooling subsystem to cool a passenger cabin, wherein the chiller cooling subsystem and the cabin cooling subsystem are completely separate from each other.

20 Claims, 2 Drawing Sheets

(51) Int. Cl.
   *B60K 1/00*      (2006.01)
   *B60K 6/28*      (2007.10)
   *B60K 11/02*     (2006.01)
   *B60L 50/60*     (2019.01)
   *B60L 50/70*     (2019.01)
   *B60L 58/26*     (2019.01)
   *H01M 10/613*    (2014.01)
   *H01M 10/625*    (2014.01)
   *H01M 10/6556*   (2014.01)
   *H01M 10/6568*   (2014.01)
   *H01M 10/66*     (2014.01)

(52) U.S. Cl.
   CPC .......... *B60L 58/26* (2019.02); *H01M 10/613* (2015.04); *H01M 10/625* (2015.04); *H01M 10/6556* (2015.04); *H01M 10/6568* (2015.04); *H01M 10/66* (2015.04); *B60H 2001/00307* (2013.01); *B60H 2001/3267* (2013.01); *B60K 2001/005* (2013.01); *B60K 6/28* (2013.01); *B60L 50/60* (2019.02); *B60L 50/70* (2019.02); *B60L 2240/34* (2013.01); *B60L 2240/545* (2013.01); *B60Y 2200/141* (2013.01); *B60Y 2200/91* (2013.01); *B60Y 2200/92* (2013.01); *B60Y 2306/05* (2013.01); *H01M 2220/20* (2013.01); *Y02T 90/40* (2013.01)

(56) References Cited

U.S. PATENT DOCUMENTS

| | | | |
|---|---|---|---|
| 6,448,535 B1 * | 9/2002 | Ap | B60L 58/33 219/202 |
| 6,467,286 B2 * | 10/2002 | Hasebe | H01M 10/625 165/41 |
| 6,651,761 B1 * | 11/2003 | Hrovat | B60L 15/20 165/41 |
| 6,743,539 B2 * | 6/2004 | Clingerman | H01M 8/04358 123/41.12 |
| 6,797,421 B2 * | 9/2004 | Assarabowski | H01M 8/2475 429/441 |
| 7,048,044 B2 * | 5/2006 | Ban | B60L 50/16 165/240 |
| 7,150,159 B1 * | 12/2006 | Brummett | B60H 1/3226 62/239 |
| 7,789,176 B2 * | 9/2010 | Zhou | B60L 58/26 180/65.1 |
| 7,841,431 B2 * | 11/2010 | Zhou | B60H 1/00278 180/65.1 |
| 9,016,080 B2 * | 4/2015 | Brodie | F28D 20/028 62/239 |
| 10,069,180 B2 | 9/2018 | Smith | |
| 10,183,549 B2 * | 1/2019 | Koberstein | B60H 1/00385 |
| 10,322,617 B2 | 6/2019 | Kohl et al. | |
| 10,343,487 B2 * | 7/2019 | Koberstein | B60H 1/32284 |
| 10,486,494 B2 * | 11/2019 | Koberstein | B60H 1/00899 |
| 10,525,787 B2 * | 1/2020 | Cheng | B60H 1/2218 |
| 10,850,590 B2 * | 12/2020 | Lee | B60H 1/22 |
| 10,967,702 B2 * | 4/2021 | Mancini | B60H 1/00921 |
| 11,059,352 B2 * | 7/2021 | Leasure | B60H 1/00364 |
| 11,110,808 B2 * | 9/2021 | Lee | B60L 50/60 |
| 11,127,993 B2 * | 9/2021 | King | H01M 10/63 |
| 11,142,037 B2 * | 10/2021 | Kim | B60H 1/00278 |
| 11,167,643 B2 * | 11/2021 | Li | B60L 15/20 |
| 11,241,940 B2 * | 2/2022 | Lee | B60L 58/26 |
| 11,273,686 B2 * | 3/2022 | Chang | B60H 1/3208 |
| 11,390,137 B2 * | 7/2022 | Mackenzie | H01M 10/613 |
| 11,506,306 B2 * | 11/2022 | Schoeneman | F01P 7/167 |
| 11,708,009 B2 * | 7/2023 | Lee | G06F 17/18 180/65.1 |
| 2017/0309976 A1 * | 10/2017 | Lambert | B60H 1/00278 |
| 2020/0047591 A1 * | 2/2020 | He | B60H 1/32284 |
| 2022/0115719 A1 * | 4/2022 | King | H01M 10/663 |
| 2023/0249522 A1 * | 8/2023 | Li | B60H 1/3225 62/126 |

FOREIGN PATENT DOCUMENTS

| | | | |
|---|---|---|---|
| EP | 3012133 B1 | 10/2017 | |
| EP | 2392486 B2 * | 9/2021 | .............. B60H 1/00 |
| WO | WO-2018105925 A1 * | 6/2018 | .............. B60H 1/00 |
| WO | WO-2018105927 A1 * | 6/2018 | .............. B60H 1/00 |

* cited by examiner

THERMAL MANAGEMENT FOR ELECTRIFIED VEHICLE

RELATED APPLICATION

This application is a continuation of prior U.S. application Ser. No. 16/743,202, filed Jan. 15, 2020.

TECHNICAL FIELD

This disclosure relates generally to a thermal management system for an electrified vehicle.

BACKGROUND

An electrified vehicle is selectively driven by one or more battery powered electric machines. A high voltage traction battery pack typically powers the electric machines and other electrical loads of the electrified vehicle. The battery pack may include one or more groupings of interconnected battery cells. The battery cells generate heat during certain conditions, including during charging and discharging operations. A thermal management system is needed to manage the heat generated by the battery cells. In one example, a refrigerant chiller is used to cool the battery and is incorporated into a vehicle climate control refrigerant loop. In light-duty and heavy-duty truck applications, which provide towing capability, existing cooling strategies may not be adequate.

SUMMARY

A thermal management system for an electrified vehicle, according to an exemplary aspect of the present disclosure includes, among other things, a first cooling circuit, a second cooling circuit, and a third cooling circuit. The first cooling circuit cools a battery pack and includes a battery chiller in fluid communication with a cooling system inlet to the battery pack. The second cooling circuit cools the battery chiller and includes at least a first compressor and a first condenser in fluid communication with the battery chiller. The third cooling circuit cools a passenger cabin and includes at least a second compressor and a second condenser, and wherein the third cooling circuit is independent of the second cooling circuit.

In a further non-limiting embodiment of the foregoing system, the first cooling circuit circulates a coolant.

In a further non-limiting embodiment of any of the foregoing systems, the second and third cooling circuits circulate a refrigerant.

In a further non-limiting embodiment of any of the foregoing systems, refrigerant flow paths through the second and third cooling circuits are completely separate from each other such that there is no flow between the second and third cooling circuits.

In a further non-limiting embodiment of any of the foregoing systems, the third cooling circuit includes an evaporator in fluid communication with the second condenser and the second compressor.

In a further non-limiting embodiment of any of the foregoing systems, a fan is associated with the evaporator.

In a further non-limiting embodiment of any of the foregoing systems, a first additional fan is associated with the first condenser and a second additional fan is associated with the second condenser.

In a further non-limiting embodiment of any of the foregoing systems, a first thermal expansion valve is upstream of the battery chiller and downstream from the first condenser.

In a further non-limiting embodiment of any of the foregoing systems, a second thermal expansion valve is upstream of the evaporator and downstream of the second condenser.

In a further non-limiting embodiment of any of the foregoing systems, the electrified vehicle includes towing capability.

In a further non-limiting embodiment of any of the foregoing systems, a control system is configured to control the thermal management system based on predetermined towing conditions.

An electrified vehicle, according to yet another exemplary aspect of the present disclosure includes, among other things, a battery pack and a thermal management system to manage cooling of the battery pack. The thermal management system includes a first cooling circuit to cool the battery pack, the first cooling circuit including a battery chiller in fluid communication with a cooling system inlet to the battery pack; a second cooling circuit to cool the battery chiller, the second cooling circuit including at least a first compressor and a first condenser in fluid communication with the battery chiller; and a third cooling circuit to cool a passenger cabin, the third cooling circuit including at least a second compressor and a second condenser, and wherein the third cooling circuit is independent of the second cooling circuit.

In a further non-limiting embodiment of the foregoing vehicle, the first cooling circuit circulates a coolant, and wherein the second and third cooling circuits circulate a refrigerant.

In a further non-limiting embodiment of any of the foregoing vehicles, refrigerant flow paths through the second and third cooling circuits are completely separate from each other such that there is no flow between the second and third cooling circuits.

In a further non-limiting embodiment of any of the foregoing vehicles, the third cooling circuit includes an evaporator in fluid communication with the second condenser and the second compressor.

In a further non-limiting embodiment of any of the foregoing vehicles, a first thermal expansion valve is upstream of the battery chiller and downstream from the first condenser, and a second thermal expansion valve is upstream of the evaporator and downstream of the second condenser.

In a further non-limiting embodiment of any of the foregoing vehicles, the vehicle includes a tow hitch and a control system that is configured to control the thermal management system based on predetermined towing conditions.

A method of managing cooling of a battery pack for an electrified vehicle according to still another exemplary aspect of the present disclosure includes, among other things, providing a first cooling circuit to cool a battery pack, wherein the first cooling circuit includes a battery chiller in fluid communication with a cooling system inlet to the battery pack; providing a second cooling circuit to cool the battery chiller, wherein the second cooling circuit includes at least a first compressor and a first condenser in fluid communication with the battery chiller; providing a third cooling circuit to cool a passenger cabin, wherein the third cooling circuit includes at least a second compressor and a second condenser; and configuring the second and third cooling circuits such that second and the third cooling circuits are completely independent of each other.

In a further non-limiting embodiment of the foregoing method, the second and third cooling circuits circulate a refrigerant, and including completely separating refrigerant flow paths through the second and third cooling circuits from each other such that there is no flow between the second and third cooling circuits.

In a further non-limiting embodiment of any of the foregoing methods, the method includes providing the electrified vehicle with a tow hitch, and controlling the thermal management system based on predetermined towing conditions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details, among other things, an exemplary thermal management system for an electrified vehicle. The system is particularly effective for electrified vehicles that include towing capability.

Figure 1:
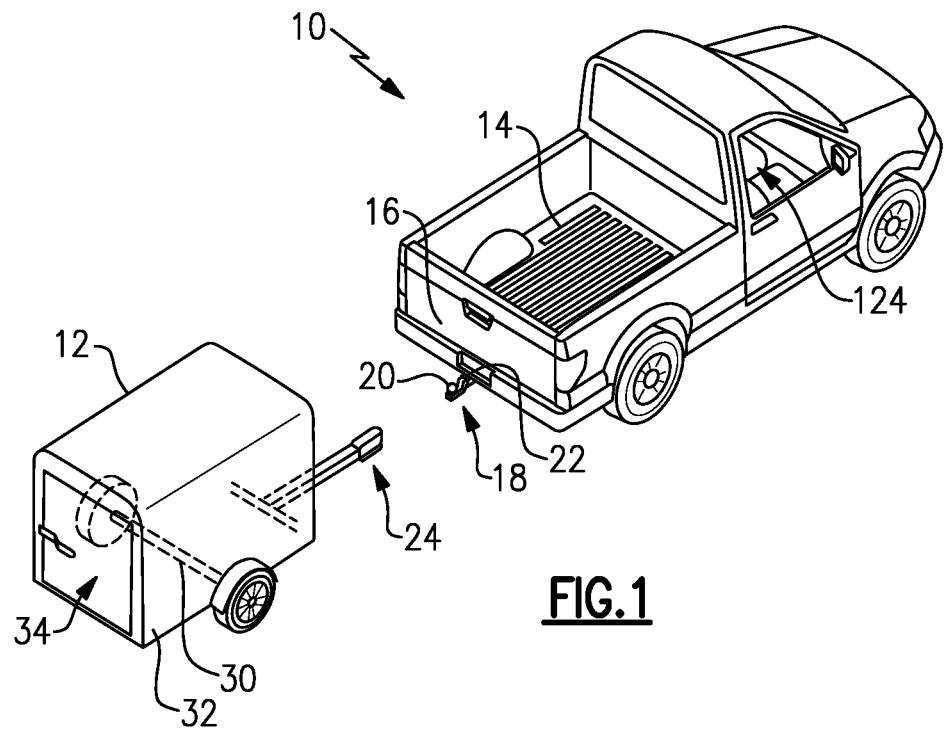
FIG. 1 illustrates an electrified vehicle that includes towing capability.

FIG. 1 shows an exemplary electrified vehicle 10 that includes towing capability to tow a trailer 12. In this example, the electrified vehicle 10 comprises a pickup truck having a truck bed 14 that is accessible via a fold-down tailgate 16. The electrified vehicle 10 also includes a tow hitch 18 that includes a hitch ball 20 extending from a drawbar 22 that is coupled to a rear of the electrified vehicle 10. The hitch ball 20 is configured to be received by a hitch coupler 24 that includes a coupler socket 26 that is provided at a distal end of a trailer tongue 28. In this example, the trailer 12 has a single axle 30 having a box frame 32 with an enclosed cargo area 34. This is just one example of a towable object, and it should be understood that the vehicle 10 could tow larger and/or different types of trailers, and could also tow boats or other towable objects.

Figure 2:
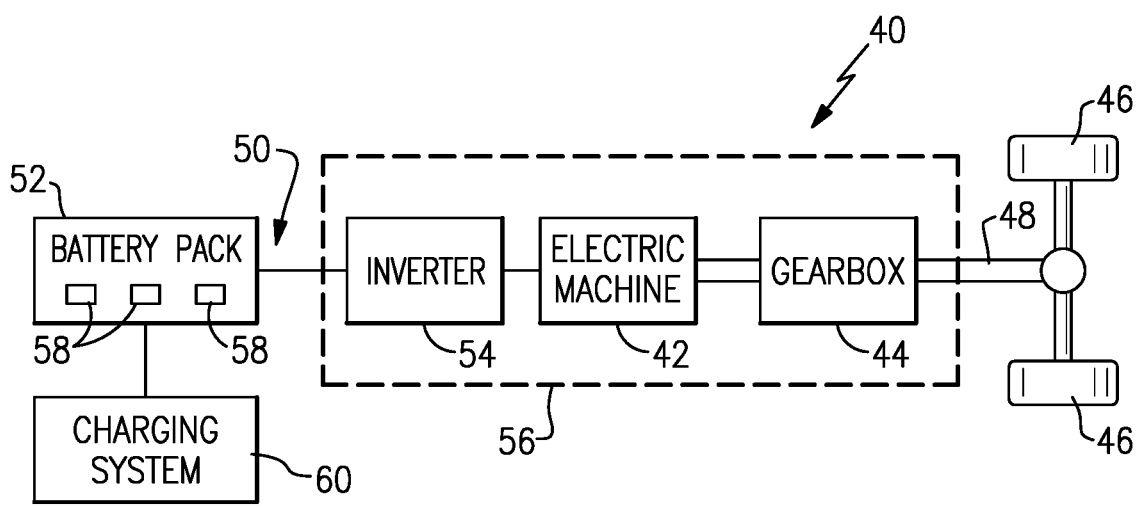
FIG. 2 schematically illustrates a powertrain of an electrified vehicle.

In one example, the electrified vehicle 10 includes a powertrain 40 as shown in FIG. 2. In an embodiment, the electrified vehicle 10 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this embodiment, the electrified vehicle 10 could be equipped with an internal combustion engine that can be employed either alone or in combination with other energy sources to propel the electrified vehicle 10.

In the illustrated embodiment, the electrified vehicle 10 is a full electric vehicle propelled solely through electric power, such as by an electric machine 42, without any assistance from an internal combustion engine. The electric machine 42 may operate as an electric motor, an electric generator, or both. The electric machine 42 receives electrical power and provides a rotational output torque. The electric machine 42 may be connected to a gearbox 44 for adjusting the output torque and speed of the electric machine 42 by a predetermined gear ratio. The gearbox 44 is connected to a set of drive wheels 46 by an output shaft 48. A voltage bus 50 electrically connects the electric machine 42 to a battery pack 52 through an inverter 54, which can also be referred to as an inverter system controller (ISC). The electric machine 42, the gearbox 44, and the inverter 54 may be collectively referred to as a transmission 56 of the electrified vehicle 10.

The battery pack 52 is an exemplary electrified vehicle battery. The battery pack 52 may be a high voltage traction battery pack that includes a plurality of battery arrays 58 (i.e., battery assemblies or groupings of battery cells) capable of outputting electrical power to operate the electric machine 42 and/or other electrical loads of the electrified vehicle 10. Other types of energy storage devices and/or output devices can also be used to electrically power the electrified vehicle 10.

The electrified vehicle 10 may also be equipped with a charging system 60 for charging the energy storage devices (e.g., battery cells) of the battery pack 52. The charging system 60 may include charging components that are located both onboard the electrified vehicle 10 (e.g. vehicle inlet assembly, etc.) and external to the electrified vehicle 10 (e.g., electric vehicle supply equipment (EVSE), etc.). The charging system 60 can be connected to an external power source (e.g., a wall outlet, a charging station, etc.) for receiving and distributing power received from the external power source throughout the electrified vehicle 10.

The powertrain 40 depicted by FIG. 2 is highly schematic and is not intended to limit this disclosure. Various additional components could alternatively or additionally be employed by the powertrain 40 within the scope of this disclosure.

Figure 3:
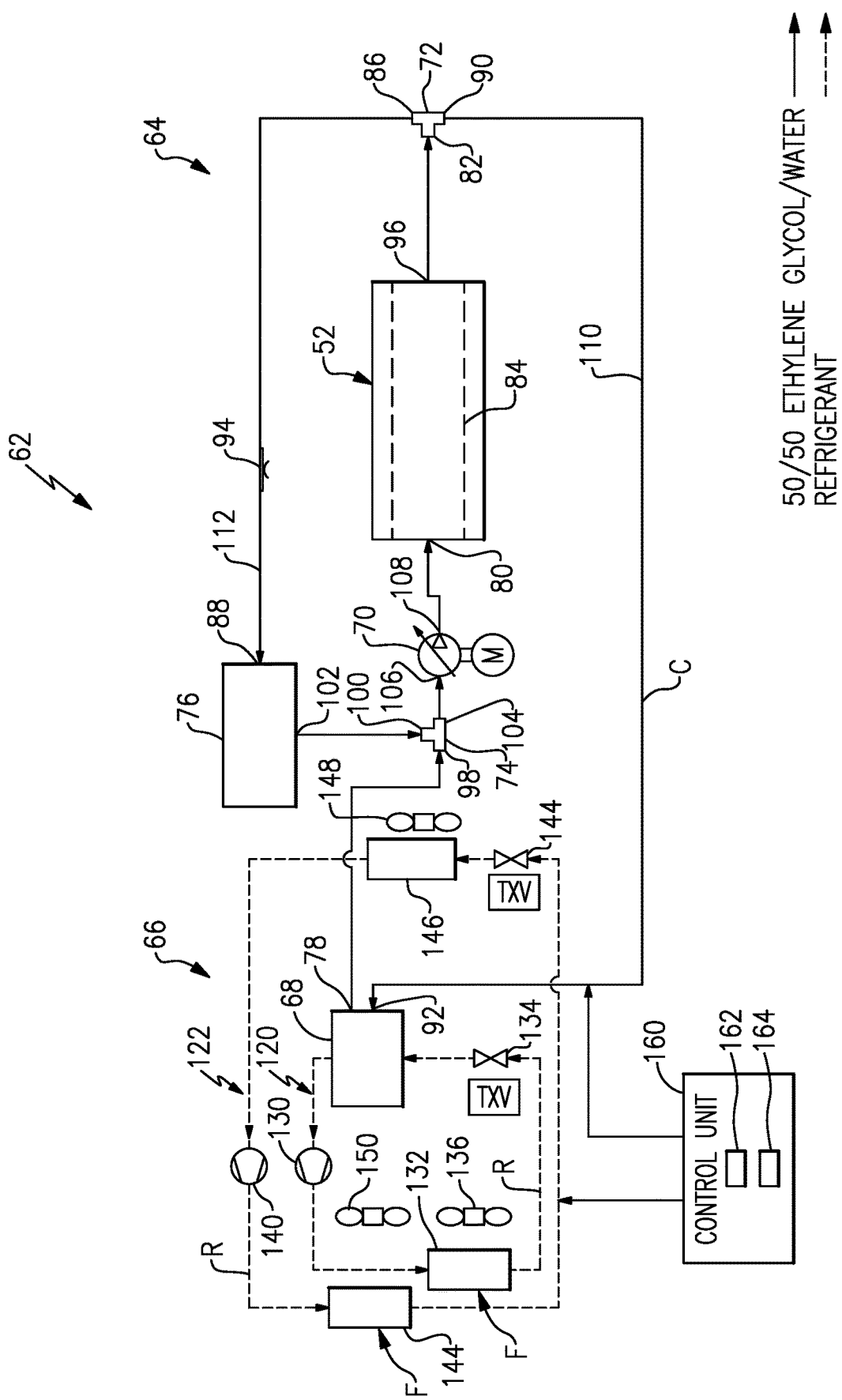
FIG. 3 illustrates a thermal management system for thermally managing a battery pack of an electrified vehicle according to an exemplary embodiment of this disclosure.

FIG. 3 schematically illustrates a thermal management system 62 that can be incorporated into an electrified vehicle, such as the electrified vehicle 10 of FIG. 1. In an embodiment, the thermal management system 62 includes a first circuit or subsystem 64 for circulating a coolant C and a second circuit or subsystem 66 for circulating a refrigerant R. The first subsystem 64 (coolant subsystem) is shown in solid lines and the second subsystem 66 (refrigerant subsystem) is shown in dashed lines in FIG. 3. These subsystems are each detailed below.

The first subsystem 64, or coolant loop/circuit, circulates the coolant C, such as water mixed with ethylene glycol or any other suitable coolant, to thermally manage the battery pack 52. The coolant C may be circulated through an internal cooling circuit 84 of the battery pack 52 for removing heat from battery cells of the battery pack 52 in a convective heat transfer process, for example. The first coolant circuit or subsystem 64 includes at least a chiller 68, a pump 70, a first T-joint 72, a second T-joint 74, and a degas overflow bottle 76. Although only schematically shown, the various components of the coolant subsystem 64 can be fluidly interconnected by conduits or passages such as tubes, hoses, pipes, etc.

During operation of the coolant subsystem 64, thermal energy is transferred from coolant C to refrigerant R of the refrigerant subsystem 66 within the chiller 68 in order to reduce the temperature of the coolant C. The chiller 68 therefore facilitates the transfer of thermal energy between the coolant subsystem 64 and the refrigerant subsystem 66.

The pump 70 circulates the coolant C through the coolant subsystem 64. In an embodiment, the pump 70 is located between an outlet 78 of the chiller 68 and an inlet 80 of the battery pack 52. However, the pump 66 could also be located elsewhere within the coolant subsystem 64.

The first T-joint 72 has an inlet 82 that is in fluid communication with an outlet 96 from the battery pack 52, a first outlet 86 that fluidly connects to an inlet 88 to the degas overflow bottle 76, and a second outlet 90 that fluidly connects to an inlet 92 to the chiller 68. In one example, a restrictor 94 is positioned upstream of the degas overflow bottle 76 and downstream of the first outlet 86.

The second T-joint has a first inlet 98 that is fluidly connected to the outlet 78 of the chiller 68, a second inlet 100 that is fluidly connected to an outlet 102 from the degas overflow bottle 76, and an outlet 104 that is fluidly connected to an inlet 106 of the pump 70. An outlet 108 from the pump 70 is fluidly connected to the inlet 80 to the battery pack 52.

The coolant C that exits from the outlet 96 of the battery pack 52 may flow to the first T-joint 72. The first T-joint 72 may then split the coolant C exiting the battery pack 52 between two different portions, a first portion of which may be returned to the chiller 68 in a coolant line 110 for re-cooling and a second portion of which may be communicated within a coolant line 112 to the degas overflow bottle 76. The degas overflow bottle 76 allows entrained air and gasses in the coolant C to be separated from the coolant C as it flows through the degas overflow bottle 76. The coolant C exiting the degas overflow bottle 76 may be recombined with coolant C communicated from the chiller 68 via the second T-joint 74.

The refrigerant subsystem 66, or refrigerant loop, includes a chiller cooling subsystem 120 to cool the battery chiller 68 and cabin cooling subsystem 122 to cool a passenger cabin 124 (FIG. 1) of the electrified vehicle 10. The chiller cooling subsystem 120 and the cabin cooling subsystem 122 are completely separate from each other such that there is no refrigerant flow between the two subsystems.

In one example, the chiller cooling subsystem 120 includes a first compressor 130, a first condenser 132, a first thermal expansion valve 134, and the chiller 68. The first compressor 130 pressurizes and circulates the refrigerant R through the chiller cooling subsystem 120. Thermal energy may be transferred from the refrigerant R to ambient air outside the electrified vehicle within the first condenser 132. A first fan 136 may be positioned adjacent to the first condenser 132 and is configured to draw an airflow F through the first condenser 132 for undergoing convective heat transfer with the refrigerant R. For example, the airflow F exchanges heat with the refrigerant R as the two fluids flow across/through the first condenser 132.

The cooled refrigerant R may then be communicated to the first thermal expansion valve 134. The first thermal expansion valve 134 is configured to change (e.g., reduce) the pressure of the refrigerant R prior to communicating the refrigerant R to the chiller 68. The refrigerant R passing to the chiller 68 may exchange heat with the coolant C passing through the chiller 68, thereby cooling the coolant C in order to prepare the coolant C for cooling the battery pack 52. The refrigerant R exiting the chiller 68 may then return to the first compressor 130 and the conditioning cycle may repeat itself.

In one example, the cabin cooling subsystem 122 includes a second compressor 140, a second condenser 142, a second thermal expansion valve 144, and an evaporator 146 with an associated second fan 148. The second compressor 140 pressurizes and circulates the refrigerant R through the cabin cooling subsystem 122. Thermal energy may be transferred from the refrigerant R to ambient air outside the electrified vehicle within the second condenser 142. A third fan 150 may be positioned adjacent to the second condenser 142 and is configured to draw an airflow F through the second condenser 142 for undergoing convective heat transfer with the refrigerant R. For example, the airflow F exchanges heat with the refrigerant R as the two fluids flow across/through the second condenser 142.

The cooled refrigerant R may then be communicated to the second thermal expansion valve 144. The second thermal expansion valve 144 is configured to change (e.g., reduce) the pressure of the refrigerant R prior to communicating the refrigerant R to the evaporator 146. The refrigerant R passing to the evaporator 146 may exchange heat with the coolant C passing through the evaporator 146. For example, when the liquid refrigerant R reaches the evaporator 146 the pressure has been reduced by the thermal expansion valve 144, dissipating its heat content and making it much cooler than the fan air flowing around it. This causes the refrigerant R to absorb heat from the warm air. The refrigerant R then vaporizes, absorbing the maximum amount of heat. This heat is then carried by the refrigerant R from the evaporator 146 as a low-pressure gas to the low side of the second compressor 140, where the conditioning cycle can repeat itself.

A control unit 160 may control operation of the thermal management system 62, including operation of both the coolant 64 and refrigerant 66 subsystems. The control unit 160 could be a stand-alone control unit associated with the thermal management system 62 or could be part of an overall vehicle control unit, such as a vehicle system controller (VSC) that includes a powertrain control unit, a transmission control unit, an engine control unit, a battery control module, etc. It should therefore be understood that the control unit 160 and one or more other controllers can collectively be referred to as a "control unit" that is configured to control, such as through a plurality of integrated algorithms, various actuators in response to signals from various inputs associated with the thermal management system 62. The various controllers that make up the VSC can communicate with one another using a common bus protocol (e.g., CAN), for example.

In an embodiment, the control unit 160 is programmed with executable instructions for interfacing with and operating the various components of the thermal management system 62 for thermally managing the heat generated by the battery pack 52 and any other electric drive components. The control unit 160 may include various inputs and outputs for interfacing with the various components of the thermal management system 62, including but not limited to the battery pack 52, the pump 70, thermal expansion valves (134, 144), and the fans (136, 148, 150), for example. The control unit 160 may further include a processing unit 162 and non-transitory memory 164 for executing the various control strategies and modes of the thermal management system 62.

Traditionally, electrified vehicles use a refrigerant chiller to cool the battery pack and it is integrated into an existing cabin climate control refrigerant loop that provides air conditioning (A/C) for the passenger cabin. However, in vehicle applications that provide for towing capability, there is not sufficient cooling capacity. Trailer towing up steep grades under high ambient loads and with a high trailer load can generate a significant amount of heat. Priority between battery cooling and A/C cabin cooling is determined by a climate control strategy. Current strategies give priority to A/C cabin cooling when battery heat generation is low; however, when battery heat generation is high, the battery cooling has priority and heat within the cabin can increase significantly leading to passenger discomfort.

The subject disclosure provides for a thermal management system 62 with an additional refrigerant circuit, e.g. the chiller cooling subsystem 120, to independently cool the battery pack 52, which reduces the load on the cabin cooling subsystem 122 used to provide air conditioning for the cabin 124. The subject thermal management system 62 is particularly effective for electrified vehicles that include towing capability. In one example, the control unit 160 controls the thermal management system 62 based on predetermined towing conditions and/or vehicle/environmental operational characteristics such as speed, grade, ambient temperature, battery temperature, etc., such that battery cooling can be done independently of the A/C cabin cooling. The two refrigerant subsystems 120, 122 are completely separate from each other and from the coolant subsystem. The coolant subsystem and the chiller cooling system 120 both provide for cooling of the chiller 68, while the cabin cooling system independently cools the cabin. Additionally, during DC fast charging, the A/C cabin cooling compressor 140 does not have to be turned on, which reduces wear on the compressor.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A thermal management system for an electrified vehicle, comprising:
 a coolant subsystem cooling a battery pack, the coolant subsystem including a battery chiller in fluid communication with a cooling system inlet to the battery pack, wherein the coolant subsystem circulates a coolant; and
 a refrigerant subsystem including a chiller cooling subsystem to cool the battery chiller and a cabin cooling subsystem to cool a passenger cabin, wherein the refrigerant subsystem circulates a refrigerant, and wherein the chiller cooling subsystem and the cabin cooling subsystem are completely separate from each other such that there is no flow between the chiller cooling subsystem the cabin cooling subsystem.

2. The system according to claim 1, wherein the chiller cooling subsystem includes at least a first compressor and a first condenser in fluid communication with the battery chiller, and wherein the cabin cooling subsystem includes at least a second compressor and a second condenser.

3. The system according to claim 2, wherein the chiller cooling subsystem comprises a first refrigerant flow path and the cabin cooling subsystem comprises a second refrigerant flow path that is completely separate from the first refrigerant flow path such that there is no flow between the chiller cooling subsystem and the cabin cooling subsystem.

4. The system according to claim 3, wherein the coolant subsystem circulates the coolant through an internal cooling circuit of the battery pack, and wherein thermal energy is transferred from the coolant to the refrigerant of the refrigerant subsystem within the battery chiller in order to reduce a temperature of the coolant.

5. The system according to claim 2, wherein the chiller cooling subsystem includes a first thermal expansion valve upstream of the battery chiller and downstream from the first condenser.

6. The system according to claim 5, wherein the cabin cooling subsystem includes an evaporator in fluid communication with the second condenser and the second compressor, and a second thermal expansion valve upstream of the evaporator and downstream of the second condenser.

7. The system according to claim 1, wherein the electrified vehicle includes towing capability.

8. The system according to claim 7, including a control system configured to control the thermal management system based on predetermined towing conditions.

9. The system according to claim 8, wherein the control system comprises one or more controllers that control the thermal management system based on one or more of speed, grade, ambient temperature, battery temperature, and trailer load, such that battery cooling is independent of cabin cooling.

10. The system according to claim 9, wherein the one or more controllers control the thermal management system based on the speed, the grade, the ambient temperature, the battery temperature, and the trailer load.

11. The system according to claim 1, wherein the coolant comprises water mixed with ethylene glycol that circulates separate from the refrigerant.

12. The system according to claim 1, wherein an outlet from the battery pack feeds directly into an inlet to the battery chiller.

13. The system according to claim 12, wherein an outlet of the battery chiller feeds into the cooling system inlet to the battery pack.

14. The system according to claim 13, including a pump that circulates the coolant through the coolant subsystem, wherein the pump is located between the outlet of the battery chiller and the cooling system inlet to the battery pack.

15. The system according to claim 13, wherein the chiller cooling subsystem includes a first compressor, a first condenser, a first thermal expansion valve, and the battery chiller, and wherein the first compressor pressurizes and circulates the refrigerant through the chiller cooling subsystem and thermal energy is transferred from the refrigerant to ambient air via the first condenser.

16. The system according to claim 15, including a first fan positioned adjacent to the first condenser to draw an airflow through the first condenser to undergo convective heat transfer with the refrigerant, and wherein the refrigerant is communicated to the first thermal expansion valve to reduce pressure of the refrigerant prior to communicating the refrigerant to the battery chiller.

17. The system according to claim 16, wherein the refrigerant passing through the battery chiller exchanges thermal energy with the coolant passing through the battery chiller to cool the coolant that enters the cooling system inlet to the battery pack, and wherein the refrigerant exiting the battery chiller is returned to the first compressor.

18. The system according to claim 17, wherein the cabin cooling subsystem includes a second compressor, a second condenser, a second thermal expansion valve, and an evaporator with a second fan, and wherein the second compressor pressurizes and circulates the refrigerant through the cabin cooling subsystem and thermal energy is transferred from the refrigerant to ambient air via the second condenser.

19. The system according to claim 18, including a third fan positioned adjacent to the second condenser that draws airflow through the second condenser to undergo convective heat transfer with the refrigerant, and wherein cooled refrigerant is then communicated to the second thermal expansion valve to reduce pressure of the refrigerant prior to communicating the refrigerant to the evaporator.

20. The system according to claim 19, wherein the refrigerant passing through the evaporator exchanges thermal energy with the coolant passing through the evaporator causing the refrigerant to absorb heat from warm air and the refrigerant vaporizes to absorb a maximum amount of heat, and wherein heated refrigerant from the evaporator is carried as a low-pressure gas to a low side of the second compressor.

* * * * *